US011006146B2

United States Patent
Park et al.

(10) Patent No.: US 11,006,146 B2
(45) Date of Patent: May 11, 2021

(54) INTRA-PREDICTION METHOD, AND ENCODER AND DECODER USING SAME

(71) Applicant: LG ELECTRONICS INC., Seoul (KR)

(72) Inventors: Joonyoung Park, Seoul (KR); Seungwook Park, Seoul (KR); Jaehyun Lim, Seoul (KR); Jungsun Kim, Seoul (KR); Younghee Choi, Seoul (KR); Byeongmoon Jeon, Seoul (KR); Yongjoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/835,894

(22) Filed: Mar. 31, 2020

(65) Prior Publication Data

US 2020/0228835 A1 Jul. 16, 2020

Related U.S. Application Data

(63) Continuation of application No. 14/692,134, filed on Apr. 21, 2015, now Pat. No. 10,645,415, which is a
(Continued)

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11); *H04N 19/117* (2014.11); *H04N 19/176* (2014.11)

(58) Field of Classification Search
CPC .. H04N 19/593; H04N 19/117; H04N 19/105; H04N 19/176; H04N 19/11; H04N 19/103
See application file for complete search history.

(56) References Cited

U.S. PATENT DOCUMENTS

| 8,224,100 B2 | 7/2012 | Jeong |
| 2004/0136458 A1 | 7/2004 | Dahlhoff et al. |

(Continued)

FOREIGN PATENT DOCUMENTS

| CN | 1589028 A | 3/2005 |
| CN | 1596546 A | 3/2005 |

(Continued)

OTHER PUBLICATIONS

W. Han et al.: "Improved Video Compression Efficiency Through Flexible Unit Representation and Corresponding Extension of Coding Tools," in IEEE Transactions on Circuits and Systems for Video Technology, vol. 20, No. 12, pp. 1709-1720, Dec. 2010, doi: 10.1109/TCSVT.2010.2096212 (12 Pages).

(Continued)

*Primary Examiner* — Joseph G Ustaris
*Assistant Examiner* — Jill D Sechser
(74) *Attorney, Agent, or Firm* — Dentons US LLP

(57) ABSTRACT

The present invention relates to an intra-prediction method and to an encoder and decoder using same. The intra-prediction method according to one embodiment of the present invention comprises the steps of deriving a prediction mode of a current block; and generating a prediction block with respect to the current block on the basis of the prediction mode of the current block. When the prediction mode of the current block is an intra-angular prediction mode, values of boundary samples from among left boundary samples and upper boundary samples of the prediction block, which are not positioned in a prediction direction of the intra-angular prediction mode, are derived on the basis of reference samples positioned in the prediction direction of the intra-angular prediction mode, and on the basis of adjacent reference samples.

15 Claims, 14 Drawing Sheets

Related U.S. Application Data continuation of application No. 14/113,708, filed as application No. PCT/KR2012/003093 on Apr. 20, 2012, now Pat. No. 10,368,090.

(60) Provisional application No. 61/478,912, filed on Apr. 25, 2011.

(51) Int. Cl.
*H04N 19/176* (2014.01)
*H04N 19/11* (2014.01)
*H04N 19/117* (2014.01)

(56) References Cited

U.S. PATENT DOCUMENTS

| | | | |
|---|---|---|---|
| 2006/0072676 A1 | 4/2006 | Gomila | |
| 2007/0133891 A1 | 6/2007 | Jeong | |
| 2009/0011000 A1 | 1/2009 | Hinz et al. | |
| 2009/0110070 A1 | 4/2009 | Takahashi | H04N 19/176 375/240.12 |
| 2009/0225834 A1 | 9/2009 | Song et al. | 375/240.12 |
| 2009/0225838 A1 | 9/2009 | Chujoh et al. | |
| 2009/0296812 A1 | 12/2009 | Kim et al. | |
| 2010/0128995 A1 | 5/2010 | Drugeon et al. | 382/238 |
| 2011/0038414 A1 | 2/2011 | Song | H04N 19/105 375/240.12 |
| 2011/0261880 A1 | 10/2011 | Auyeung | H04N 19/105 375/240.12 |
| 2011/0280304 A1 | 11/2011 | Jeon et al. | |
| 2013/0016780 A1 | 1/2013 | Oh | |
| 2019/0104304 A1* | 4/2019 | Lee | H04N 19/176 |
| 2019/0394460 A1* | 12/2019 | Lee | H04N 19/86 |
| 2020/0204826 A1* | 6/2020 | Rath | H04N 19/593 |

FOREIGN PATENT DOCUMENTS

| | | |
|---|---|---|
| CN | 1720747 A | 1/2006 |
| CN | 101330617 A | 12/2008 |
| CN | 101383970 A | 3/2009 |
| CN | 101682781 A | 3/2010 |
| CN | 101827270 A | 9/2010 |
| CN | 101854545 A | 10/2010 |
| CN | 101965734 A | 2/2011 |
| DE | 10158658 A1 | 6/2003 |
| EP | 1 796 395 A2 | 6/2007 |
| EP | 2081386 A1 | 7/2009 |
| EP | 2651137 A2 | 10/2013 |
| JP | 2005512419 A | 4/2005 |
| JP | 2006-513635 A | 4/2006 |
| JP | 4015934 B2 | 11/2007 |
| JP | 2009094828 A | 4/2009 |
| JP | 2012517752 A | 8/2012 |
| JP | 2013524681 A | 6/2013 |
| JP | 2013-534384 A | 9/2013 |
| JP | 2013537771 A | 10/2013 |
| JP | 2016077006 A | 5/2016 |
| JP | 6258980 B2 | 1/2018 |
| KR | 2007-0062146 A | 6/2007 |
| KR | 100739790 B1 | 7/2007 |
| KR | 2009-0095316 A | 9/2009 |
| KR | 2009-0123559 A | 12/2009 |
| RU | 2407221 C1 | 12/2010 |
| WO | 2004/064406 A1 | 7/2004 |
| WO | 2008088140 A1 | 7/2008 |
| WO | 2009/110753 A | 10/2009 |
| WO | 2009/126299 A1 | 10/2009 |
| WO | 2010/047499 A2 | 4/2010 |
| WO | 2010091504 A1 | 8/2010 |
| WO | 2010120113 A2 | 10/2010 |
| WO | 2011/086836 A1 | 7/2011 |
| WO | 12018197 A2 | 2/2012 |
| WO | 12023762 A2 | 2/2012 |

OTHER PUBLICATIONS

McCann et al. Samsung's Response to the call for Proposals on Video Compression Technology. In Joint Collaborative Team on Video Coding, (JCT-VC) of ITU-T SG16 WP3 and ISO/IEC JTC1/SC29/WG11. 1st Meeting Dresden, DE Apr. 15-23, 2010 Document: JCTVC-A124 (42 Pages).

Mitsubishi Electric Corporation and NHK (Japan Broadcasting Corporation), "LUT-based adaptive filtering on intra prediction samples", Joint Collaborative Team on Video Coding (JCT-VC) of ITU-T SG16 WP3 and ISO/IEC JTC1/SC29/WG11, JCTVC-D109, Jan. 20-28, 2011, XP030008149.

Jingli Zhou et al. "An interpolation method by Predicting the direction of pixel texture changing trend for H.264/AVC intra prediction," Second International Symposium on Intelligent Information Technology Application, Dec. 20, 2008, vol. 1, pp. 884-888.

U.S. Patent Office on Dec. 20, 2016 corresponding to U.S. Appl. No. 14/113,708, 12 pages.

Joint Collaborative Team on Video Coding (JCT-VC), "CE6.e: Report on Planar Intra Prediction by LG", 5th Meeting: Geneva, CH, Mar. 16-23, 2011, p. 1-7.

Search Report dated Nov. 19, 2014 in corresponding Spanish Patent Application No. P201390088, 6 pages.

European Search Report dated Oct. 23, 2014 for European Application No. 12775964.5, 9 pages.

K. Sugimoto, et al. "CE6.f: LUT-Based Adaptive Filtering on Intra Prediction Samples", Mar. 10, 2011. No. JCTVC-E069. Mar. 10, 2011 (Mar. 10, 2011), XP030008575.ISSN: 0000-0007; Section "2 Tested Scheme".

K. McCann et al. (Zetacast/Samsung), "Video Coding Technology Proposal by Samsung (and BBC)", 1. JCT-VC Meeting; Apr. 15, 2010-Apr. 23, 2010; Dresden; (Joint Collaborative Team on Video Coding of ISO/IEC JTC1/SC29/WG11 and ITU-TSG.16); URL: Http://WFTP3.Itu.Int/Av-Arch/JCTVC-Site/Apr. 16, 2010. XP030007574.ISSN: 0000-0049, pp. 15 "Intra: Arbitrary Direction Intra (ADI) 11", p. 19 "Intra: Combined Intra Prediction (CIP)", p. 25 "Loop Filtering: Extreme correction (EX)".

T. Wiegand et al: "Overview of the H.264/AVC Video Coding Standard", IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI: 10.1109(TCSVT.2003.815165(the whole document)).

International Search Report dated Nov. 16, 2012 for Application No. PCT/KR2012/003093, with English Translation, 4 pages.

"Design of Digital Filters" downloaded from https://www.robots.ox.ac.uk/~sjrob/Teaching/SP/I6.pdf on Aug. 4, 2019, PDF created on Nov. 7, 2000, describing the engineering principle of low pass filter including a simple moving-average filter called the Hanning filter. (Year: 2000).

Akira Minezawa, et al., "An improved intra vertical and horizontal prediction", JCTVC-F172, Joint Collaborative Team on Video Coding (JCT-VC) of ITU-T SG16 WP3 and ISO/IEC JTC1/SC29/WG11, 6th Meeting: Torino, IT, Jul. 14-22, 2011.

Office Action of Japanese Patent Office in Appl'n No. 2019-166370, dated Dec. 22, 2020.

\* cited by examiner

INTRA-PREDICTION METHOD, AND ENCODER AND DECODER USING SAME

This application is a Continuation of application Ser. No. 14/692,134 filed on Apr. 21, 2015, now allowed, which is a Continuation of application Ser. No. 14/113,708 filed on Nov. 13, 2013, now U.S. Pat. No. 10,368,090, which is a U.S. National Phase Application under 35 U.S.C. § 371 of International Application PCT/KR2012/003093, filed on Apr. 20, 2012, which claims the benefit of U.S. Provisional Application No. 61/478,912, filed on Apr. 25, 2011, the entire contents of which are hereby incorporated by reference in their entireties.

TECHNICAL FIELD

The present invention relates to an intra prediction method in a video encoder and a video decoder, and more particularly, to a method of deriving a value of a specific boundary sample of a predicted block of a current block and a device using the method.

BACKGROUND ART

In recent years, demands for a high-resolution and high-quality video have increased in various fields of applications. However, as a video has a higher resolution and higher quality, an amount of data on the video increases more and more.

When a high-resolution and high-quality video with a large amount of data is transferred using media such as existing wired or wireless broadband lines or is stored in existing storage media, the transfer cost and the storage cost thereof increase. Accordingly, in order to effectively transfer, store, and reproduce the high-resolution and high-quality video, high-efficiency video compressing techniques can be utilized.

In order to enhance video compression efficiency, an inter prediction method and an intra prediction method can be used.

In the inter prediction, pixel values of a current picture are predicted from temporally previous and/or subsequent pictures. In the intra prediction, pixel values of a current picture are predicted using inter-pixel relationships in the same picture. In the intra prediction, pixel values of a current picture are predicted using pixel information of the current picture.

In addition to the inter prediction and the intra prediction, weight prediction for preventing degradation in quality due to illumination variations or the like, entropy encoding of allocating a short code to a symbol having a high appearance frequency and allocating a long code to a symbol having a low appearance frequency, and the like can be used.

SUMMARY OF THE INVENTION

Technical Problem

An object of the invention is to provide an effective video compression technique and a device using the technique.

Another object of the invention is to provide an intra prediction method that can enhance prediction efficiency and a device using the method.

Another object of the invention is to provide a method of deriving a value of a specific boundary sample of a predicted block of a current block and a device using the method.

Solution to Problem

According to an aspect of the invention, there is provided an intra prediction method. The intra prediction method includes the steps of deriving a prediction mode of a current block; and constructing a predicted block of the current block on the basis of the prediction mode. When the prediction mode is an Intra directional prediction mode (Intra_Angular prediction mode), a value of a boundary sample not located in the prediction direction of the Intra directional prediction mode (Intra_Angular prediction mode) out of a left boundary sample and a top boundary sample of the predicted block is derived on the basis of a reference sample located in the prediction direction and a reference sample adjacent to the boundary sample.

When the Intra directional prediction mode (Intra_Angular prediction mode) is a vertical prediction mode, a value of the left boundary sample may be derived on the basis of a top reference sample of the left boundary sample and a reference sample adjacent to the left boundary sample. A value of a predicted sample other than the left boundary sample may be derived to be a value of the top reference sample of the predicted sample.

When the Intra directional prediction mode (Intra_Angular prediction mode) is a vertical prediction mode, a value of the left boundary sample may be derived on the basis of a top reference sample of the left boundary sample, a reference sample adjacent to the left boundary sample, and a reference sample neighboring to the left-top edge of the current block.

When the Intra directional prediction mode (Intra_Angular prediction mode) is a horizontal prediction mode, a value of the top boundary sample may be derived on the basis of a left reference sample of the top boundary sample and a reference sample adjacent to the top boundary sample. A value of a predicted sample other than the top boundary sample may be derived to be a value of a left reference sample of the predicted sample.

When the Intra directional prediction mode (Intra_Angular prediction mode) is a horizontal prediction mode, a value of the top boundary sample may be derived on the basis of a left reference sample of the top boundary sample, a reference sample adjacent to the top boundary sample, and a reference sample neighboring to the left-top edge of the current block.

When the prediction direction is a top-right direction, a value of the left boundary sample may be derived on the basis of a reference sample located in the prediction direction and a reference sample adjacent to the left boundary sample.

When the prediction direction is a left-bottom direction, a value of the top boundary sample may be derived on the basis of a reference sample located in the prediction direction and a reference sample adjacent to the top boundary sample.

According to another aspect of the invention, there is provided a video encoder. The video encoder includes: a prediction module that constructs a predicted block of a current block on the basis of a prediction mode of the current block; and an entropy encoding module that encodes information on the predicted block. When the prediction mode is an Intra directional prediction mode (Intra_Angular prediction mode), the prediction module derives a value of a boundary sample not located in the prediction direction of the Intra directional prediction mode (Intra_Angular prediction mode) out of a left boundary sample and a top boundary sample of the predicted block on the basis of a reference sample located in the prediction direction and a reference sample adjacent to the boundary sample.

According to still another aspect of the invention, there is provided a video decoder. The video decoder includes: an entropy decoding module that entropy-decodes information received from an encoder; and a prediction module that constructs a predicted block of a current block on the basis of the entropy-decoded information. When the prediction mode of the current block is an Intra directional prediction mode (Intra_Angular prediction mode), the prediction module derives a value of a boundary sample not located in the prediction direction of the Intra directional prediction mode (Intra_Angular prediction mode) out of a left boundary sample and a top boundary sample of the predicted block on the basis of a reference sample located in the prediction direction and a reference sample adjacent to the boundary sample.

When the Intra directional prediction mode (Intra_Angular prediction mode) is a vertical prediction mode, the prediction module may derive a value of the left boundary sample on the basis of a top reference sample of the left boundary sample and a reference sample adjacent to the left boundary sample.

When the Intra directional prediction mode (Intra_Angular prediction mode) is a vertical prediction mode, the prediction module may derive a value of the left boundary sample on the basis of a top reference sample of the left boundary sample, a reference sample adjacent to the left boundary sample, and a reference sample neighboring to the left-top edge of the current block.

When the Intra directional prediction mode (Intra_Angular prediction mode) is a horizontal prediction mode, the prediction module may derive a value of the top boundary sample on the basis of a left reference sample of the top boundary sample and a reference sample adjacent to the top boundary sample.

When the Intra directional prediction mode (Intra_Angular prediction mode) is a horizontal prediction mode, the prediction module may derive a value of the top boundary sample on the basis of a left reference sample of the top boundary sample, a reference sample adjacent to the top boundary sample, and a reference sample neighboring to the left-top edge of the current block.

Advantageous Effects

According to the invention, it is possible to enhance intra prediction efficiency and to improve video compression performance.

According to the invention, it is possible to enhance accuracy of a value of a predicted sample located adjacent to a reference sample.

DESCRIPTION OF EXEMPLARY EMBODIMENTS

Figure 1:
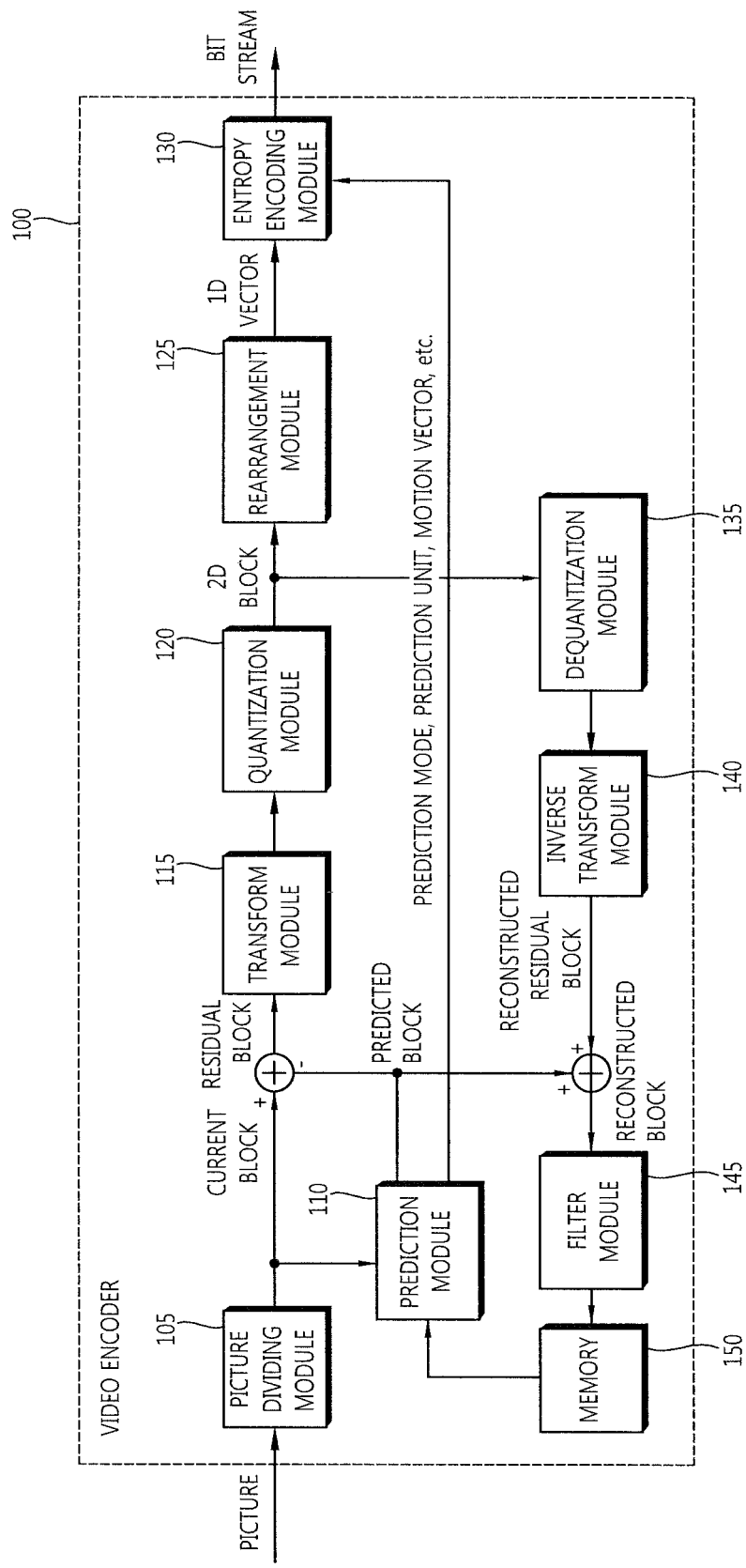
FIG. 1 is a block diagram schematically illustrating a video encoder according to an embodiment of the invention.

The invention can have various embodiments and specific embodiments thereof will be described in detail with reference to the accompanying drawings. However, the invention is not limited to the specific embodiments and can be modified in various forms without departing from the technical scope of the invention.

Terms used in the below description are used to merely describe specific embodiments, but are not intended for limiting the technical spirit of the invention. An expression of a singular number includes an expression of a plural number, so long as it is clearly read differently.

On the other hand, elements in the drawings described in the invention are independently drawn for the purpose of convenience for explanation of different specific functions in a video encoder/decoder and does not mean that the respective elements are embodied by independent hardware or independent software. For example, two or more of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating a video encoder according to an embodiment of the invention. Referring to FIG. 1, a video encoder 100 includes a picture dividing module 105, a prediction module 110, a transform module 115, a quantization module 120, a rearrangement module 125, an entropy encoding module 130, a dequantization module 135, an inverse transform module 140, a filter module 145, and a memory 150.

The picture dividing module 105 may divide an input picture into one or more process units. Here, the process unit may be a prediction unit ("PU"), a transform unit ("TU"), or a coding unit ("CU").

The prediction module 110 includes an inter prediction module that performs an inter prediction process and an intra prediction module that performs an intra prediction process. The prediction module 110 performs a prediction process on the process units of a picture divided by the picture dividing module 105 to construct a predicted block. Here, the process unit of a picture may be a CU, a TU, or a PU. The prediction module 110 determines whether the inter prediction or the intra prediction will be performed on the corresponding process unit, and performs a prediction process using the determined prediction method. Here, the process unit subjected to the prediction process may be different from the process unit of which the prediction method is determined. For example, the prediction method may be determined in the units of PU and the prediction process may be performed in the units of TU.

In the inter prediction, the prediction process is performed on the basis of information on at least one of a previous picture and/or a subsequent picture of a current picture to construct a predicted block. In the intra prediction, the prediction process is performed on the basis of pixel information of a current picture to construct a predicted block.

In the inter prediction, a reference picture is selected for a current block and a reference block with the same size as the current is selected in the units of inter pixel samples. Subsequently, a predicted block in which a residual value from the current block is minimized and the motion vector magnitude is minimized is constructed. In the inter prediction, a skip mode, a merge mode, an MVP (Motion Vector Prediction) mode, and the like may be used. The predicted block may be constructed in the unit of pixel samples such as ½ pixel samples and ¼ pixel samples less than an integer pixel. Here, the motion vector may also be expressed in the unit of pixel samples less than an integer pixel. For example, luma components may be expressed in the unit of ¼ pixels and chroma components may be expressed in the unit of ⅛ pixels. The information such as an index of a reference picture selected through the inter prediction, a motion vector, and a residual signal is entropy-encoded and is transmitted to the decoder.

In the intra prediction, the prediction mode may be determined by prediction units and the prediction process may be performed by prediction units or transform unit. In the intra prediction, 33 directional prediction modes and at least two non-directional modes may be supported. Here, the non-directional prediction modes may include a DC prediction mode and a planar mode.

On the other hand, when a sample is used in this specification, it means that information of the sample, for example, a pixel value, is used. For the purpose of convenience for explanation, an expression "sample information is used" or "a pixel value is used" may be simply expressed by "a sample is used".

A prediction unit may have various sizes/shapes. For example, in case of inter prediction, the prediction unit may have sizes such as 2N×2N, 2N×N, N×2N, and N×N. In case of intra prediction, the prediction unit may have sizes such as 2N×N and N×N. Here, the prediction unit having a size of N×N may be set to be used for only a specific case. For example, the prediction unit having a size of N×N may be set to be used for only a coding unit having the smallest size or may be set to be used for only the intra prediction. In addition to the prediction units having the above-mentioned sizes, prediction units having sizes such as N×mN, mN×N, 2N×mN, and mN×2N (where m<1) may be additionally defined and used.

A residual block between the constructed predicted block and the original block is input to the transform module 115. Information such as the prediction mode, the prediction unit, and the motion vector used for the prediction is entropy-encoded by the entropy encoding module 130 and is transmitted to the decoder.

The transform module 115 performs a transform process on the residual block and creates transform coefficients. The process unit in the transform module 115 may be a transform unit and may have a quad tree structure. The size of the transform unit may be determined within a predetermined range of the largest and smallest sizes. The transform module 115 may transform the residual block using a DCT (Discrete Cosine Transform) and/or a DST (Discrete Sine Transform).

The quantization module 120 quantizes the transform coefficients created by the transform module 115 and creates quantization coefficients. The quantization coefficients created by the quantization module 120 are supplied to the rearrangement module 125 and the dequantization module 135.

The rearrangement module 125 may rearrange the quantization coefficients supplied from the quantization module 120. By rearranging the quantization coefficients, it is possible to enhance the encoding efficiency in the entropy encoding module 130. The rearrangement module 125 rearranges the quantization coefficients in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the quantization coefficients supplied from the quantization module 120.

The entropy encoding module 130 performs an entropy encoding process on the quantization coefficients rearranged by the rearrangement module 125. Here, encoding methods such as an exponential golomb method and a CABAC (Context-Adaptive Binary Arithmetic Coding) method may be used. The entropy encoding module 130 encodes a variety of information such as block type information, prediction mode information, division unit information, prediction unit information, transfer unit information, motion vector information, reference picture information, block interpolation information, and filtering information transmitted from the prediction module 110.

The entropy encoding module 130 may give a predetermined change to a parameter set or a syntax to be transmitted, if necessary.

The dequantization module 135 dequantizes the values quantized by the quantization module 120. The inverse transform module 140 inversely transforms the values dequantized by the dequantization module 135. The residual block reconstructed by the dequantization module 135 and the inverse transform module 140 is added to the predicted block constructed by the prediction module 110 to construct a reconstructed block.

The filter module 145 applies a deblocking filter, an ALF (Adaptive Loop Filter), an SAO (Sample Adaptive Offset), or the like to the reconstructed picture.

The deblocking filter removes block distortion generated at the boundary between blocks in the reconstructed picture. The ALF performs a filtering process on the basis of the resultant values of comparison of the original picture with the reconstructed picture is filtered by the deblocking filter. The ALF may be applied only when high efficiency is necessary. The SAO reconstructs offset differences between the residual block having the deblocking filter applied thereto and the original picture in the unit of pixels, and is applied in the form of a band offset, an edge offset, or the like.

On the other hand, a reconstructed block used for the inter prediction may not be subjected to a filtering process.

The memory 150 stores the reconstructed block or picture. The reconstructed block or picture stored in the memory 150 is supplied to the prediction module 110 that performs the inter prediction.

Figure 2:
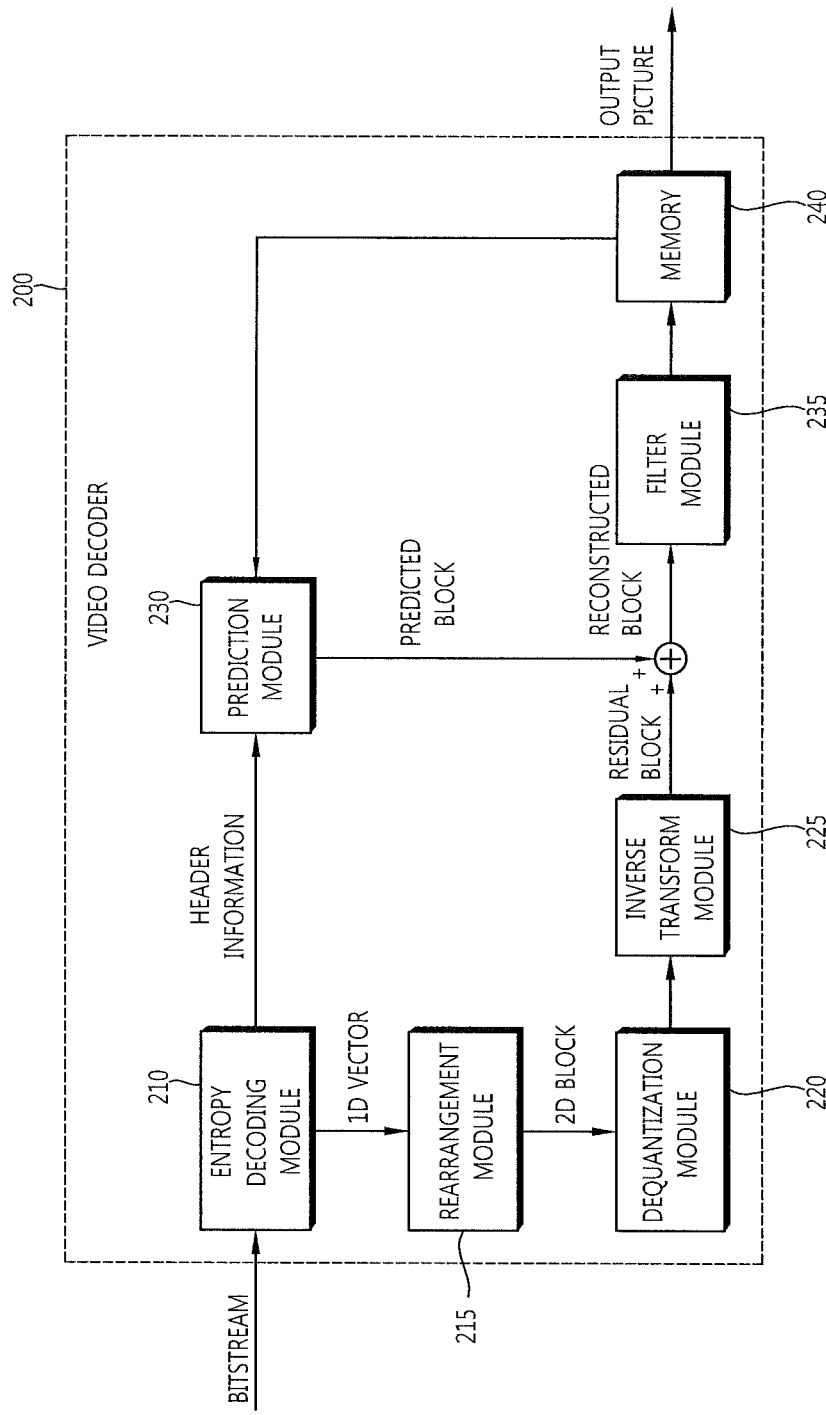
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 includes an entropy decoding module 210, a rearrangement module 215, a dequantization module 220, an inverse transform module 225, a prediction module 230, a filter module 235, and a memory 240.

When a video bitstream is input from the encoder, the input bitstream may be decoded on the basis of the order in which video information is processed by the video encoder.

For example, when the video encoder uses a CAVLC to perform the entropy encoding process, the entropy decoding module 210 performs the entropy decoding process using the CABAC to correspond thereto.

The residual signal entropy-decoded by the entropy decoding module 210 is supplied to the rearrangement module 215, and information for constructing a predicted block out of the information entropy-decoded by the entropy decoding module 210 is supplied to the prediction module 230.

The rearrangement module 215 rearranges the bitstream entropy-decoded by the entropy decoding module 210 on the basis of the rearrangement method used in the video encoder. The rearrangement module 215 is supplied with the information associated with the coefficient scanning performed by the encoder and reconstructs and rearranges the coefficients expressed in the form of a one-dimensional vector to the coefficients in the form of a two-dimensional block by inversely performing the scanning on the basis of the scanning order in which the scanning is performed by the encoder.

The dequantization module 220 performs dequantization on the basis of the quantization parameters supplied from the encoder and the rearranged coefficient values of the block.

The inverse transform module 225 performs the inverse transform of the transform performed by the transform module of the encoder. The inverse transform may be performed on the basis of a transfer unit or a division unit determined by the encoder. The transform module of the encoder may selectively perform the DCT and DST depending on plural pieces of information such as the prediction method, the size of the current block, and the prediction direction, and the inverse transform module 225 of the decoder may perform the inverse transform on the basis of the transform information on the transform performed by the transform module of the encoder.

The prediction module 230 constructs a predicted block on the basis of predicted block construction information supplied from the entropy decoding module 210 and the previously-decoded block and/or picture information supplied from the memory 240. The reconstructed block is constructed on the basis of the predicted block constructed by the prediction module 230 and the residual block supplied from the inverse transform module 225. For example, when a current block is encoded in an inter prediction mode, the inter prediction is performed on the current prediction unit on the basis of information included in at least one of a previous picture and a subsequent picture of the current picture. Here, motion information necessary for the inter prediction, such as a motion vector and a reference picture index, may be derived from a skip flag, a merge flag, and the like supplied from the encoder.

The reconstructed block and/or picture may be supplied to the filter module 235. The filter module 235 performs a deblocking filtering process, an SAO (Sample Adaptive Offset) process, and/or an adaptive loop filtering process on the reconstructed block and/or picture.

The reconstructed picture or block may be stored in the memory 240 for use as a reference picture or a reference block and may be supplied to an output module (not shown).

On the other hand, the encoder encodes an encoding target block using the most efficient encoding method on the basis of video information of the encoding target block, and the decoder determines the decoding method on the basis of the encoding method used in the encoder. The encoding method used in the encoder may be derived from the bitstream transmitted from the encoder or on the basis of the information of a decoding target block. When a current block is encoded in an intra prediction mode, the intra prediction of constructing a predicted block is performed on the basis of pixel information of the current picture.

Figure 3:
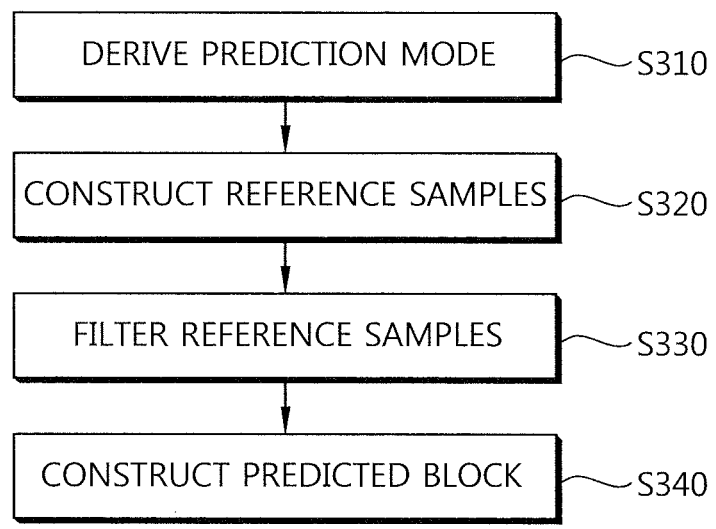
FIG. 3 is a flowchart schematically illustrating an intra prediction method in the video decoder.

FIG. 3 is a flowchart schematically illustrating an intra prediction method in a video decoder.

The decoder derives a prediction mode of a current block (S310).

An intra prediction mode may have a prediction direction depending on positions of reference samples used for the prediction. The intra prediction mode having a prediction direction is referred to as an intra directional prediction mode (Intra_Angular prediction mode). On the contrary, examples of an intra prediction mode not having a prediction direction include an Intra_Planar prediction mode, an Intra_DC prediction mode, and an Intra_Fromlum prediction mode.

Figure 4:
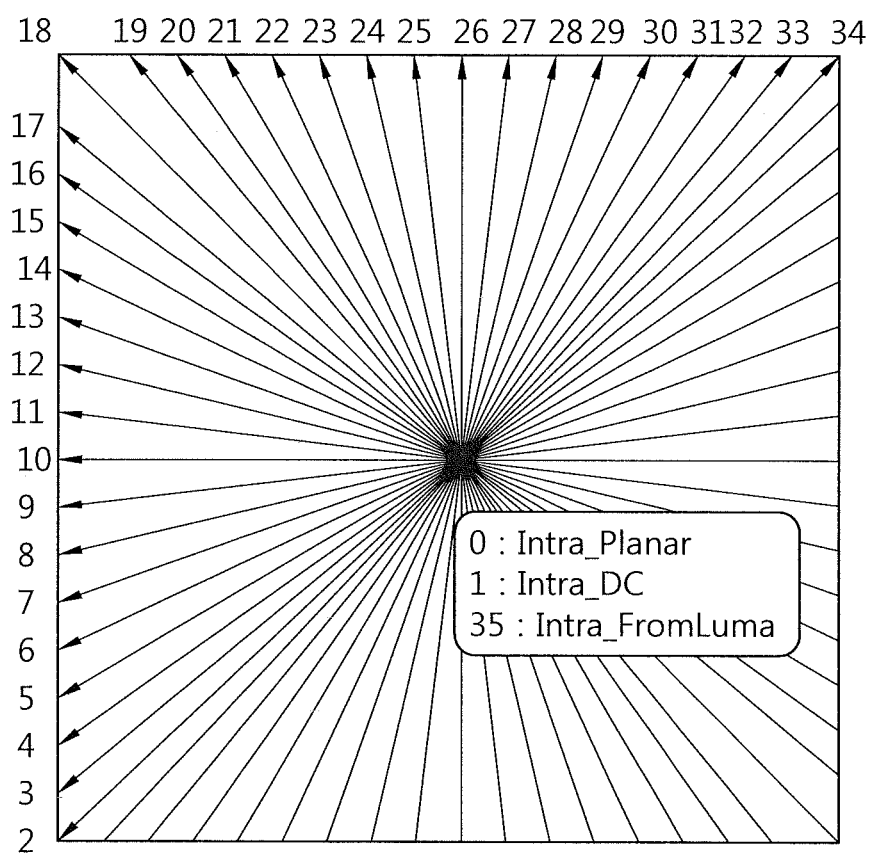
FIG. 4 is a diagram illustrating prediction directions in an intra prediction mode.

FIG. 4 illustrates prediction directions in the intra prediction modes and Table 1 shows mode values of the intra prediction modes illustrated in FIG. 4.

TABLE 1

| Intra prediction mode | Associated names |
|---|---|
| 0 | Intra_Planar |
| 1 | Intra_DC |
| 2 . . . 34 | Intra_Angular |
| 35 | Intra_FromLima |

In the intra prediction, a prediction process is performed on a current block on the basis of the derived prediction mode. The reference samples and the specific prediction method used for the prediction vary depending on the prediction modes. Accordingly, when the current block is encoded in an intra prediction mode, the decoder derives the prediction mode of the current block to perform the prediction.

The decoder may check whether neighboring samples of the current block can be used for the prediction, and may construct reference samples to be used for the prediction (S320). In the intra prediction, the neighboring samples of the current block mean samples with a length of 2*nS adjacent to the left boundary and the left-bottom edge of the current block with a size of nS×nS and samples with a length of 2*nS adjacent to the top boundary and the top-right edge of the current block. However, some of the neighboring samples of the current block may not be decoded yet or may not be available. In this case, the decoder may construct reference samples to be used for the prediction by substituting the non-available samples with the available sample.

The decoder may perform a filtering on the reference samples on the basis of the prediction mode (S330). The decoder may perform the filtering process on the reference samples before performing the prediction. Whether the reference samples should be subjected to the filtering process is determined depending on the prediction mode of the current block. The filtering adaptively performed on the reference samples depending on the prediction mode is referred to as MIDIS (Mode Dependent Intra Smoothing) or simply referred to as smoothing filtering.

Table 2 shows an example where it is determined whether the reference samples should be subjected to the filtering on the basis of the prediction mode.

TABLE 2

| IntraPredMode | intraFilerType for nS = 4 | intraFilterType for nS = 8 | intraFilterType for nS = 16 | intraFilterType for nS = 32 | intraFilterType for nS = 64 |
|---|---|---|---|---|---|
| Intra_Planar | 0 | 1 | 1 | 1 | 0 |
| Intra_DC | 0 | 0 | 0 | 0 | 0 |
| 2 | 0 | 1 | 1 | 1 | 0 |
| 3-8 | 0 | 0 | 1 | 1 | 0 |
| 9 | 0 | 0 | 0 | 1 | 0 |
| Intra_Horizontal | 0 | 0 | 0 | 0 | 0 |
| 11 | 0 | 0 | 0 | 1 | 0 |
| 12-17 | 0 | 0 | 1 | 1 | 0 |
| 18 | 0 | 1 | 1 | 1 | 0 |
| 19-24 | 0 | 0 | 1 | 1 | 0 |
| 25 | 0 | 0 | 0 | 1 | 0 |
| Intra_Vertical | 0 | 0 | 0 | 0 | 0 |
| 27 | 0 | 0 | 0 | 1 | 0 |
| 28-33 | 0 | 0 | 1 | 1 | 0 |
| 34 | 0 | 1 | 1 | 1 | 0 |
| Intra_FromLuma | 0 | 1 | 1 | 1 | 0 |

When intraFilterType equals to 1 in Table 2, the smoothing filtering is performed. For example, when intraPredMode is an Intra_Planar mode and nS=8 is established, the smoothing filtering may be performed. At this time, smoothing filters having various filtering coefficients may be applied. For example, a smoothing filtering having a coefficient of [1 2 1] may be applied.

The decoder constructs a predicted block of the current block on the basis of the prediction mode and the reference samples (S340). The decoder constructs the predicted block of the current block on the basis of the prediction mode derived in the prediction mode deriving step (S310) and the reference samples acquired in the reference sample filtering step (S330).

In the predicted block constructing step (S340), when the current block is encoded in the Intra_DC prediction, the left boundary samples and the top boundary samples of the predicted block may be subjected to 2-tap filtering so as to minimize discontinuity of the block boundary. Here, the boundary samples mean samples which are located in the predicted block and which are adjacent to the boundary of the predicted block.

Figure 5:
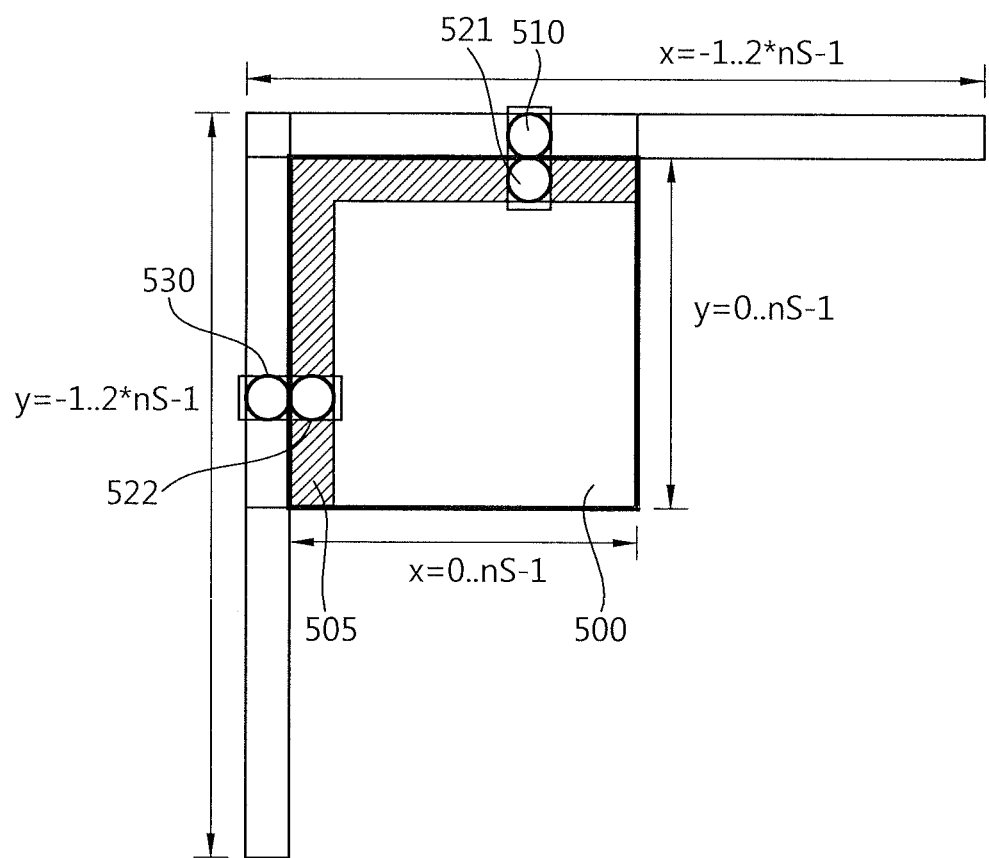
FIG. 5 is a diagram illustrating an example where a current block is encoded in an Intra_DC prediction mode.

FIG. 5 is a diagram illustrating an example where a current block is encoded in the Intra_DC prediction mode.

Referring to FIG. 5, when a current block 500 is encoded in the Intra_DC prediction mode, left boundary samples 522 and top boundary samples 521 of the current block 500 may be highly similar to left reference samples 530 and top reference samples 510, respectively, and thus a smoothing filter may be applied as illustrated in FIG. 5. In the drawing, the graded portion 505 represents a filtering target area.

In some modes of the intra directional prediction modes, the 2-tap filtering may be applied to the left boundary samples and the top boundary samples, similarly to the Intra_DC prediction mode. Here, the 2-tap filtering is not applied to both the left boundary samples and the top boundary samples, but is adaptively applied to the left boundary samples or the top boundary samples depending on the prediction direction. That is, the 2-tap filtering is applied to only the boundary samples adjacent to the reference samples actually not used for the directional prediction.

Specifically, in the predicted block constructing step (S340), when the current block is encoded in an intra directional prediction mode, the values of the predicted samples may be derived from the reference samples located in the prediction direction. Here, in some modes of the intra directional prediction modes, the boundary samples not located in the prediction direction out of the left boundary samples and the top boundary samples of the predicted block may be adjacent to reference samples not used for the prediction. That is, the distance to the reference samples not used for the prediction may be much smaller than the distance to the reference samples used for the prediction. Since there is a high possibility that the values of the predicted samples are similar to the reference samples having the smaller distances, the filtering is applied to the reference samples adjacent to the boundary samples not located in the prediction direction out of the left boundary samples and the top boundary samples in the invention so as to enhance prediction performance and encoding efficiency.

For the purpose of convenience for explanation, the procedure of deriving the values of the predicted samples in the intra directional prediction modes will be described in two steps of a step of deriving the values of the reference samples located in the prediction direction as the values of the predicted samples and a step of filtering and modifying the boundary samples not located in the prediction direction out of the left boundary samples and the top boundary samples of the predicted block. [x, y] coordinates of which the coordinate values increase in the right-bottom direction are set with respect to the left-top sample of the current block and the predicted block. The size of the current block and the predicted block is defined as nS. For example, the left-top boundary sample of the predicted block has a position of [0, 0], the left boundary samples have positions of [0, 0 . . . nS−1], and the top boundary samples have positions of [0 . . . nS−1, 0].

First, the values of the predicted samples are derived on the basis of the reference samples located in the prediction direction.

For example, when the current block is encoded in a vertical prediction mode, the values of the predicted samples are derived to be the values of the samples having the same x coordinate out of the reference samples neighboring to the top boundary of the current block. That is, the values predSamples[x, y] of the predicted samples are derived by Expression 1.

$$predSamples[x,y]=p[x,-1], \text{ with } x,y=0 \ldots nS-1 \quad \text{Expression 1}$$

Here, p[a, b] represents the value of a sample having a position of [a, b].

For example, when the current block is encoded in a horizontal prediction mode, the values of the predicted samples are derived to be the values of the samples having the same y coordinate out of the reference samples neighboring to the left boundary of the current block. That is, the values predSamples[x, y] of the predicted samples are derived by Expression 2.

$$predSamples[x,y]=p[-1,y], \text{ with } x,y=0 \ldots nS-1 \quad \text{Expression 2}$$

For example, when the current block is encoded in an intra directional prediction mode of the prediction direction is a top-right direction, the values of the predicted samples are derived to be the values of the reference samples located in the prediction direction out of the reference samples adjacent to the top boundary of the current block and the reference sample located at the top-right edge.

For example, when the current block is encoded in an intra directional prediction mode of the prediction direction is a left-bottom direction, the values of the predicted samples are derived to be the values of the reference samples located in the prediction direction out of the reference samples adjacent to the left boundary of the current block and the reference sample located at the left-bottom edge.

By deriving the values of the predicted samples on the basis of the reference samples located in the prediction direction and then filtering the boundary samples not located in the prediction direction out of the left boundary samples and the top boundary samples of the predicted block on the basis of the adjacent reference samples, it is possible to modify the values of the corresponding boundary samples. The method of filtering the boundary samples not located in the prediction direction out of the left boundary samples and the top boundary samples of the predicted block using the reference samples not located in the prediction direction will be described below in detail with reference to FIGS. 5 to 13.

Figure 6:
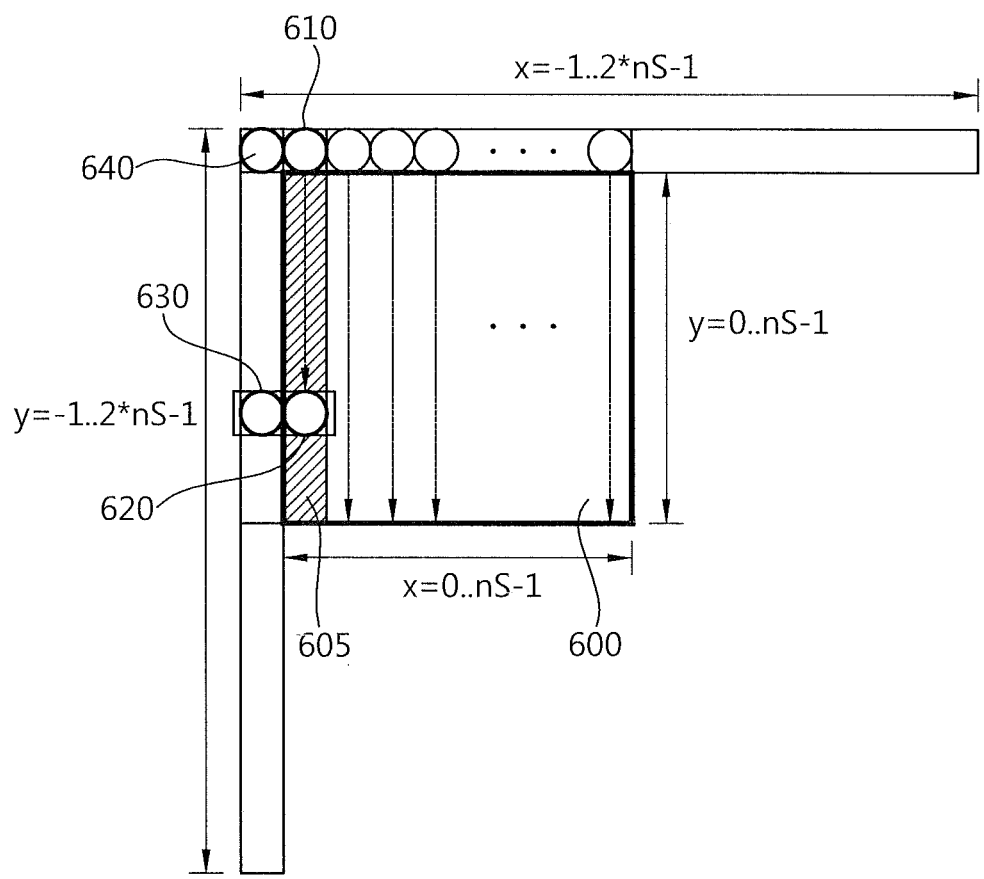
FIG. 6 is a diagram illustrating an example where the prediction direction is vertical in an intra prediction mode according to an embodiment of the invention.

FIG. 6 is a diagram illustrating an example where the prediction direction of an intra prediction mode according to an embodiment of the invention is vertical.

Referring to FIG. 6, in case of a vertical prediction mode (Intra-Vertical prediction mode), a smoothing filter may be applied to left boundary samples 620.

As described above, when a current block 600 is encoded in the vertical prediction mode, the values of the predicted samples are derived to be the values of the top reference samples. Here, the reference samples neighboring to the left boundary of the current block 600 are not used for the directional prediction, but are adjacent to the left boundary samples of the current block 600. That is, in the left boundary samples 620, the distance to the left reference samples 630 which are reference samples not used for the prediction is smaller than the distance to the top reference samples 610 which are reference samples used for the prediction. Here, the top reference samples 610 mean samples [x, −1] which are neighboring to the top boundary of the current block and which have the same x coordinate. The left reference samples 630 mean samples [−1, y] which are neighboring to the left boundary of the current block and which have the same y coordinate. Therefore, since there is a high possibility that the values of the left boundary samples 620 are similar to the values of the left reference samples 630, the smoothing filter may be applied to the left boundary samples 620 as illustrated in FIG. 6. The shaded portion 605 in the drawing represents a filtering target area.

For example, when a smoothing filter having a coefficient of [1 1]/2 is applied, the modified values predSamples[x, y] of the left boundary samples 620 can be derived by Expression 3.

$$predSamples[x,y]=p[x,-1]+(p[-1,y]/2),$$
$$\text{with } x=0,y=0 \ldots nS-1 \quad \text{Expression 3}$$

The coefficient of the filter is not limited [1 1]/2, but filters having coefficients such as [1 3]/4 and [1 7]/8 may be applied. The coefficient of the filter may be adaptively determined depending on the size of the current block.

On the other hand, information of neighboring blocks may be further considered in performing the filtering on the left reference samples. For example, the modified values of the left boundary samples 620 may be derived as expressed by Expression 4, in consideration of variations of the sample values depending on they coordinate values of the left boundary samples 620 with respect to the left-top reference sample 640.

$$predSamples[x,y]=p[x,-1]+(p[-1,y]-p[-1,-1]), \text{ with}$$
$$x=0,y=0 \ldots nS-1 \quad \text{Expression 4}$$

When the values of the left boundary samples 620 are derived using the above-mentioned method, the values of the predicted sample may exceed a defined bit depth. Therefore, the values of the predicted samples may be limited to the defined bit depth or a weight may be given to the difference therebetween. For example, in case of predicted samples of luma components, the modified values of the left boundary samples 620 may be derived by Expression 5.

$$predSamples[x,y]=\text{Clip1}_Y p[x,-1]+(p[-1,y]-p[-1,-1])/$$
$$2)), \text{ with } x=0,y=0 \ldots nS-1 \quad \text{Expression 5}$$

Figure 7:
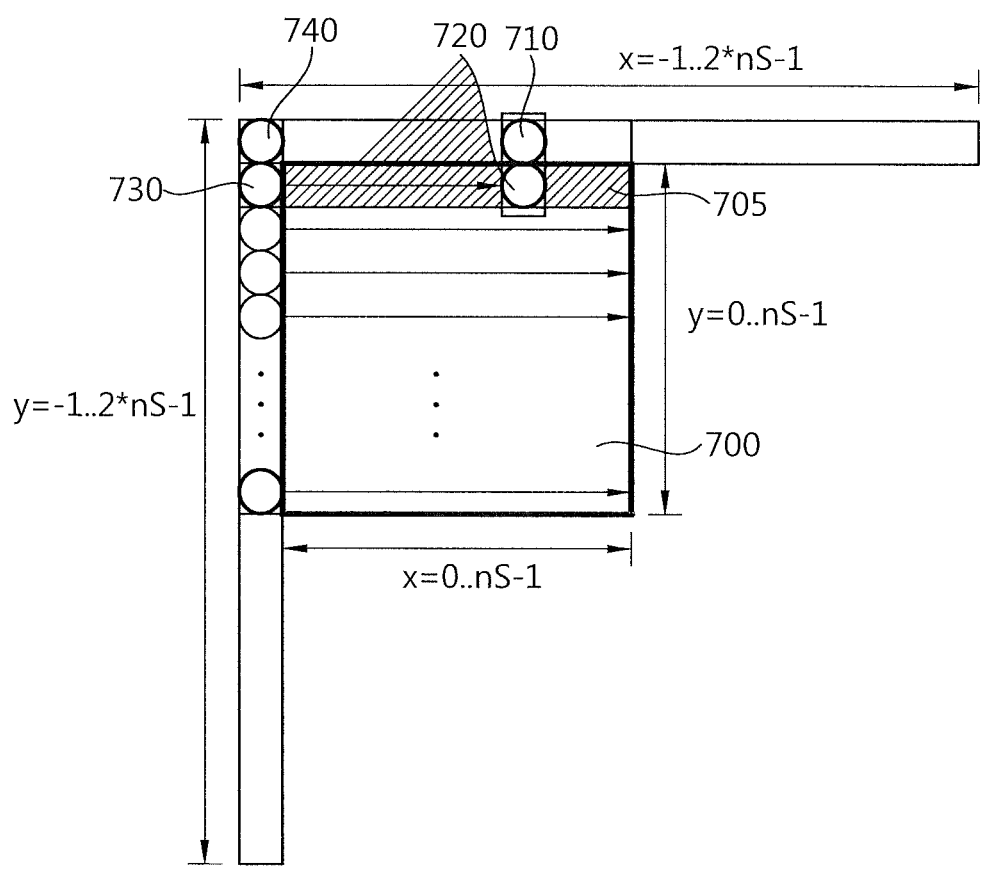
FIG. 7 is a diagram illustrating an example where the prediction direction is horizontal in an intra prediction mode according to an embodiment of the invention.

FIG. 7 is a diagram illustrating an example where the prediction direction of an intra prediction mode according to an embodiment of the invention is horizontal.

Referring to FIG. 7, in case of a horizontal prediction mode (Intra-Horizontal prediction mode), a smoothing filter may be applied to top boundary samples 720.

As described above, when a current block 700 is encoded in the vertical prediction mode, the values of the predicted samples are derived to be the values of the left reference samples. Here, the reference samples neighboring to the top boundary of the current block 700 are not used for the directional prediction, but are neighboring to the top boundary samples of the current block 700. That is, in the top boundary samples 720, the distance to the top reference samples 710 which are reference samples not used for the prediction is smaller than the distance to the left reference samples 730 which are reference samples used for the prediction. Here, the top reference samples 710 mean samples [x, −1] which are neighboring to the top boundary of the current block and which have the same x coordinate. The left reference samples 730 mean samples [−1, y] which are neighboring to the left boundary of the current block and which have the same y coordinate. Therefore, since there is a high possibility that the values of the top boundary samples 720 are similar to the values of the top reference samples 710, the smoothing filter may be applied to the top boundary samples 720 as illustrated in FIG. 7. The shaded portion 705 in the drawing represents a filtering target area.

For example, when a smoothing filter having a coefficient of [1 1]/2 is applied, the modified values predSamples[x, y] of the top boundary samples 720 can be derived by Expression 6.

predSamples[x,y]=(p[−1,y]+p[x,−1])/2, with x=0 . . . nS−1,y=0  Expression 6

The coefficient of the filter is not limited [1 1]/2, but filters having coefficients such as [1 3]/4 and [1 7]/8 may be applied. The coefficient of the filter may be adaptively determined depending on the size of the current block.

On the other hand, information of neighboring blocks may be further considered in performing the filtering on the top reference samples. For example, the modified values of the top boundary samples 720 may be derived as expressed by Expression 7, in consideration of variations of the sample values depending on the x coordinate values of the top boundary samples 720 with respect to the left-top reference sample 740.

predSamples[x,y]=p[−1,y]+(p[x,−1]−p[−1,−1]), with x=0 . . . nS−1,y=0  Expression 7

When the values of the top boundary samples 720 are derived using the above-mentioned method, the values of the predicted sample may exceed a defined bit depth. Therefore, the values of the predicted samples may be limited to the defined bit depth or a weight may be given to the difference therebetween. For example, in case of predicted samples of luma components, the modified values of the top boundary samples 720 may be derived by Expression 8.

predSamples[x,y]=Clip1$_X$(p[−1,y]+((p[x,−1]−p[−1,−1])/2)), with x=0 . . . nS−1,y=0  Expression 5

On the other hand, the method of applying the smoothing filter to the left boundary samples or the top boundary samples on the basis of the prediction mode of the current block may be applied to other intra directional prediction modes in addition to the vertical prediction mode and/or the horizontal prediction mode.

For example, the intra directional prediction modes may be classified depending on the prediction directions and the filtering may be adaptively performed depending on the groups to which the corresponding mode belongs.

Figure 8:
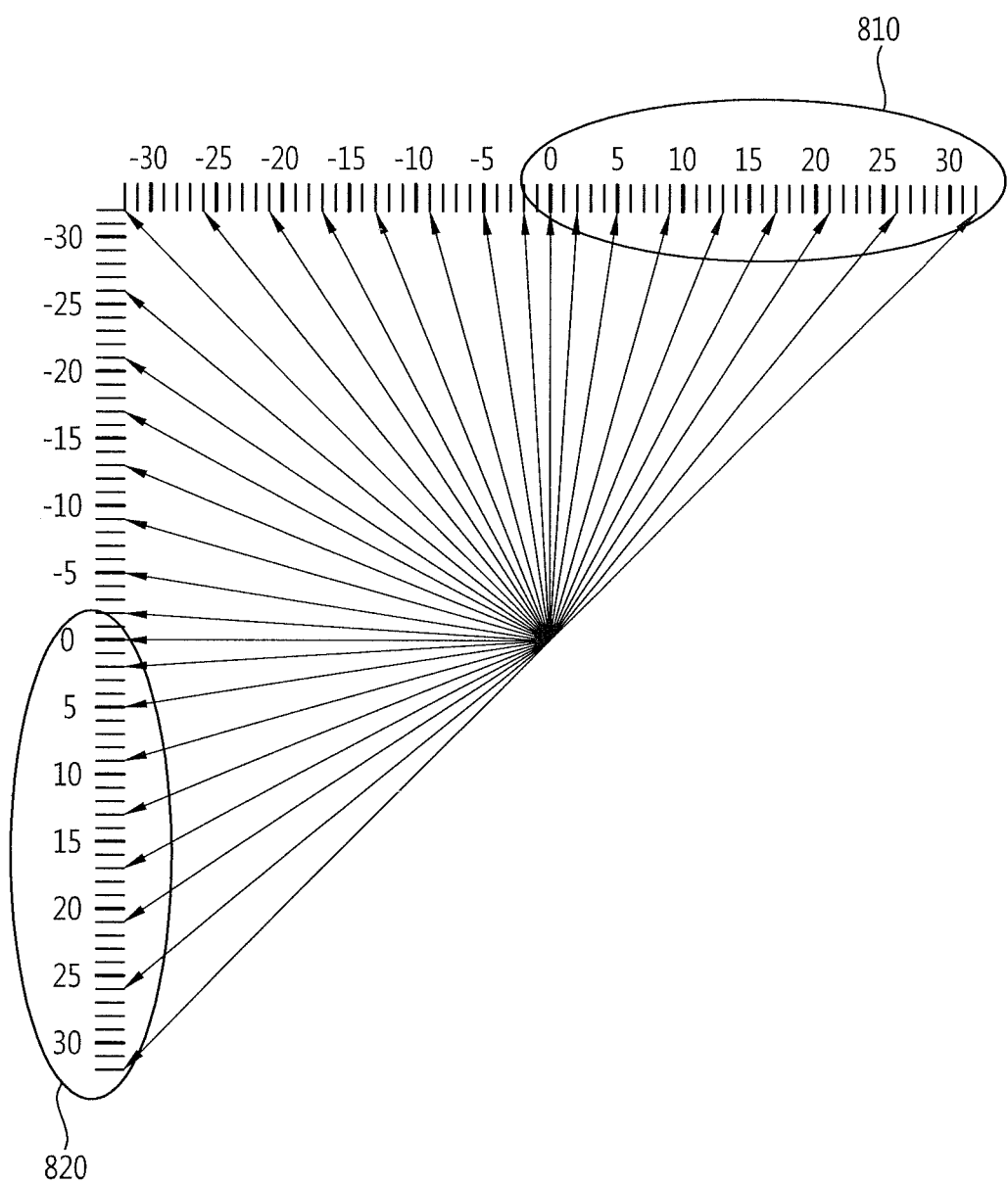
FIG. 8 is a diagram illustrating an example where the intra prediction modes are classified depending on the prediction directions.

FIG. 8 is a diagram illustrating an example where the intra prediction modes are classified depending on the prediction directions.

When the prediction direction of an intra prediction mode is a top-right direction 810, the smoothing filter may be applied to the left boundary samples, similarly to the vertical prediction mode. When the prediction direction of an intra prediction mode is a left-bottom direction 820, the smoothing filter may be applied to the top boundary samples, similarly to the horizontal prediction mode.

Figure 9:
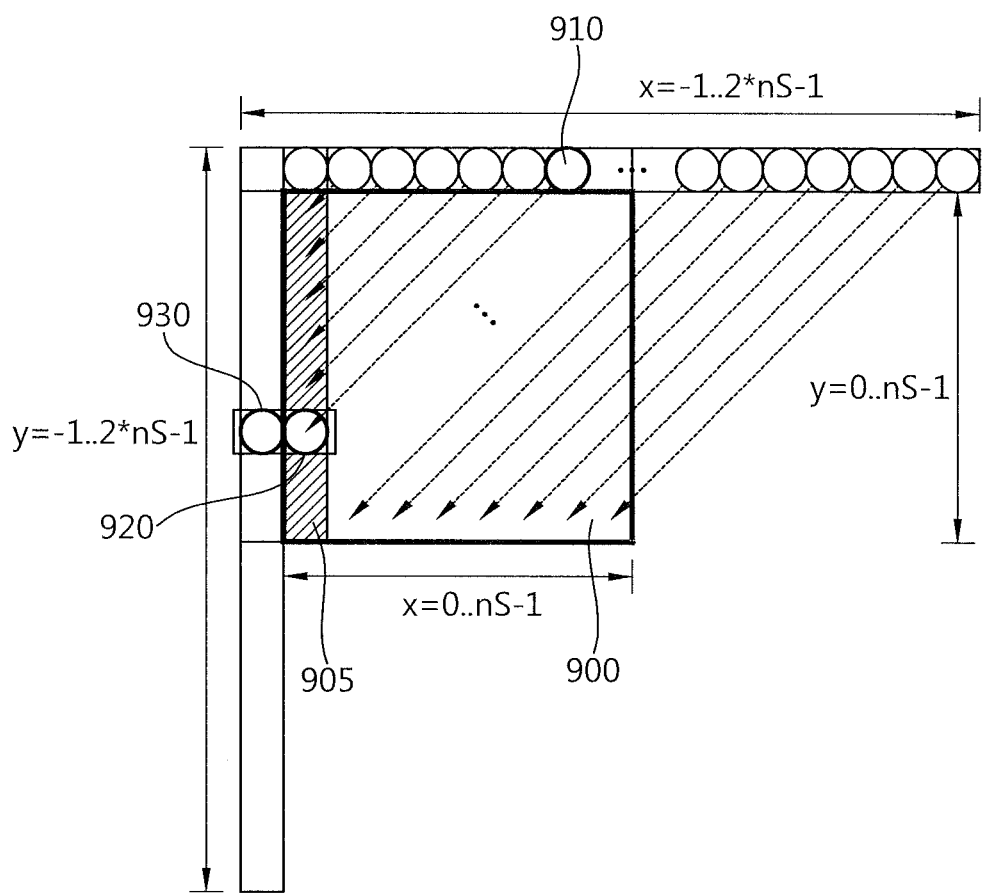
FIG. 9 is a diagram illustrating an example where the prediction direction is a top-right direction in an intra prediction mode according to an embodiment of the invention.

FIG. 9 is a diagram illustrating an example where the prediction direction of an intra prediction mode is the top-right direction according to an embodiment of the invention.

As described above, when a current block 900 is encoded in an intra directional prediction mode of which the prediction direction is the top-right direction, the values of the predicted samples are derived to be values of reference samples 910 located in the prediction direction out of the reference samples neighboring to the right boundary of the current block and a reference sample 910 located at the top-right edge. Here, the reference samples neighboring to the left boundary of the current block 900 are not used, but are adjacent to the left boundary samples. That is, the left boundary samples 920 have a distance to the left reference samples 930 smaller than the distance to the reference samples 910 located in the prediction direction. Here, the left reference samples 930 mean samples [−1, y] which are neighboring to the left boundary of the current block and which have the same y coordinate. Therefore, since there is a high possibility that the values of the left boundary samples 920 are similar to the values of the adjacent left reference samples 930, the smoothing filter may be applied to the left boundary samples 920 as illustrated in FIG. 9. The shaded portion 905 in the drawing represents a filtering target area.

Figure 10:
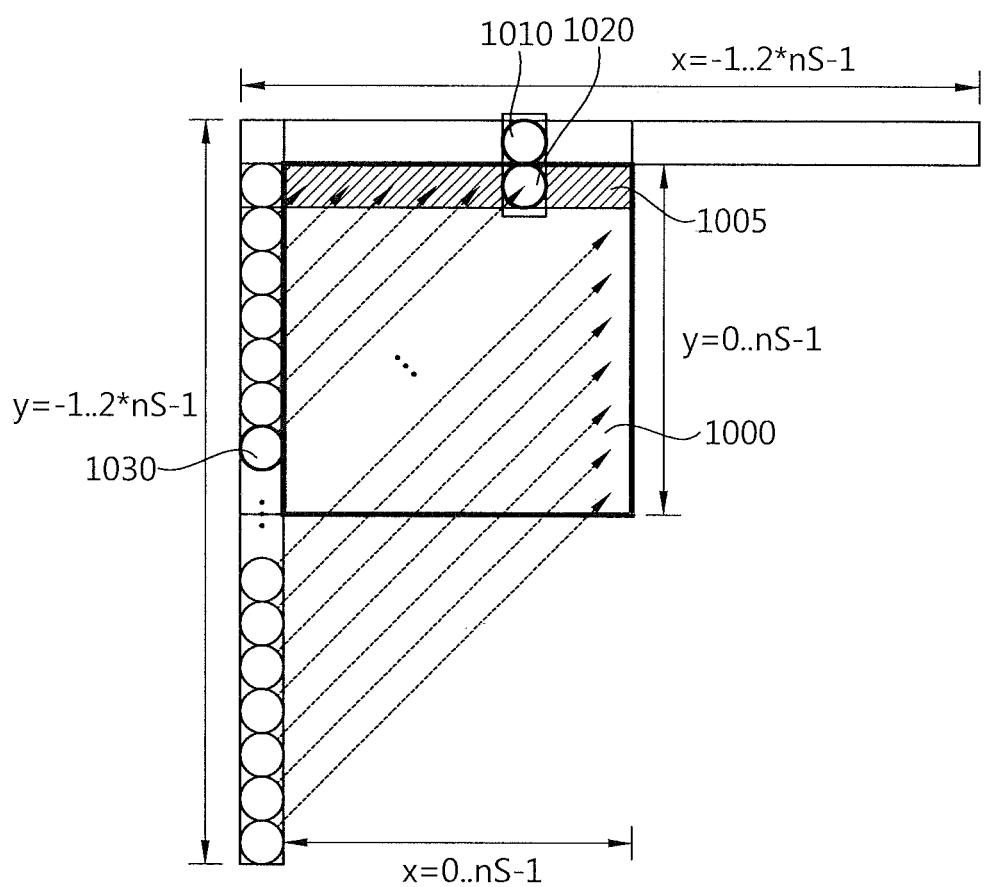
FIG. 10 is a diagram illustrating an example where the prediction direction is a left-bottom direction in an intra prediction mode according to an embodiment of the invention.

FIG. 10 is a diagram illustrating an example where the prediction direction of an intra prediction mode is the left-bottom direction according to an embodiment of the invention.

As described above, when a current block 1000 is encoded in an intra directional prediction mode of which the prediction direction is the left-bottom direction, the values of the predicted samples are derived to be values of reference samples 1030 located in the prediction direction out of the reference samples neighboring to the left boundary of the current block and a reference sample located at the left-bottom edge. Here, the reference samples neighboring to the top boundary of the current block 1000 are not used, but are neighboring to the top boundary samples. That is, the top boundary samples 1020 have a distance to the top reference samples 1010 smaller than the distance to the reference samples 1030 located in the prediction direction. Here, the top reference samples 1010 mean samples [x, −1] which are neighboring to the top boundary of the current block and which have the same x coordinate. Therefore, since there is a high possibility that the values of the top boundary samples 1020 are similar to the values of the adjacent top reference samples 1030, the smoothing filter may be applied to the top boundary samples 1020 as illustrated in FIG. 10. The shaded portion 1005 in the drawing represents a filtering target area.

On the other hand, as described above, the procedure of deriving the values of the predicted samples has been described in two steps of the step of deriving the values of the reference samples located in the prediction direction as the values of the predicted samples and the step of filtering and modifying the boundary samples not located in the prediction direction out of the left boundary samples and the top boundary samples of the predicted block for the purpose of convenience for explanation, but the procedure of deriving the values of the predicted samples may not be divided into plural steps, but may be performed in a single step. For example, in the procedure of deriving the values of the boundary samples not located in the prediction direction out of the left boundary samples and the top boundary samples of the predicted block, the step of filtering the boundary samples may not be performed as an independent step, but may be performed as a unified step with the step of deriving the values of the predicted samples to be the values of the reference samples located in the prediction direction.

For example, in the example illustrated in FIG. 6, the values of the left boundary samples 620 may be derived on the basis of the top reference samples 610 and the reference samples 630 adjacent to the left boundary samples as expressed by Expressions 3 to 5.

For example, in the example illustrated in FIG. 7, the values of the top boundary samples 720 may be derived on the basis of the left reference samples 730 and the reference samples 710 adjacent to the top boundary samples as expressed by Expressions 6 to 8.

For example, in the example illustrated in FIG. 9, the values of the left boundary samples 920 may be derived on the basis of the reference samples 910 located in the prediction direction and the reference samples 930 adjacent to the left boundary samples.

For example, in the example illustrated in FIG. 10, the values of the top boundary samples 1020 may be derived on the basis of the reference samples 1030 located in the prediction direction and the reference samples 1010 adjacent to the top boundary samples.

On the other hand, since the smoothing filtering is not performed on the predicted samples other than the boundary samples not located in the prediction direction out of the left boundary samples and the top boundary samples of the predicted block, the values of the predicted samples are derived to be the values of the reference samples in the prediction direction.

For example, when a current block is encoded in the vertical prediction mode, the values of predicted samples other than the left boundary samples are derived as expressed by Expression 9.

$$predSamples[x,y]=p[x,-1], \text{ with } x=1 \ldots nS-1, y=0 \ldots nS-1 \quad \text{Expression 9}$$

For example, when a current block is encoded in the horizontal prediction mode, the values of predicted samples other than the top boundary samples are derived as expressed by Expression 10.

$$predSamples[x,y]=p[-1,y], \text{ with } x=0 \ldots nS-1, y=1 \ldots nS-1 \quad \text{Expression 10}$$

On the other hand, the method of applying the smoothing filter to the left boundary samples or the top boundary samples on the basis of the prediction mode of the current block may not be applied to all the predicted samples of the boundary samples, but may be applied to only some thereof.

When the distance to the reference samples used for the directional prediction is small, the error of the predicted sample may not be large. In this case, it is rather accurate not to apply the smoothing filter, that is, not to consider other sample information. Therefore, it may be determined whether the filtering should be performed on the adjacent reference samples depending on the positions of the boundary samples in the block.

For example, the smoothing filter may be applied to only some of the left boundary samples in the vertical prediction mode, or the smoothing filter may be applied to only some of the top boundary samples in the horizontal prediction mode.

Figure 11:
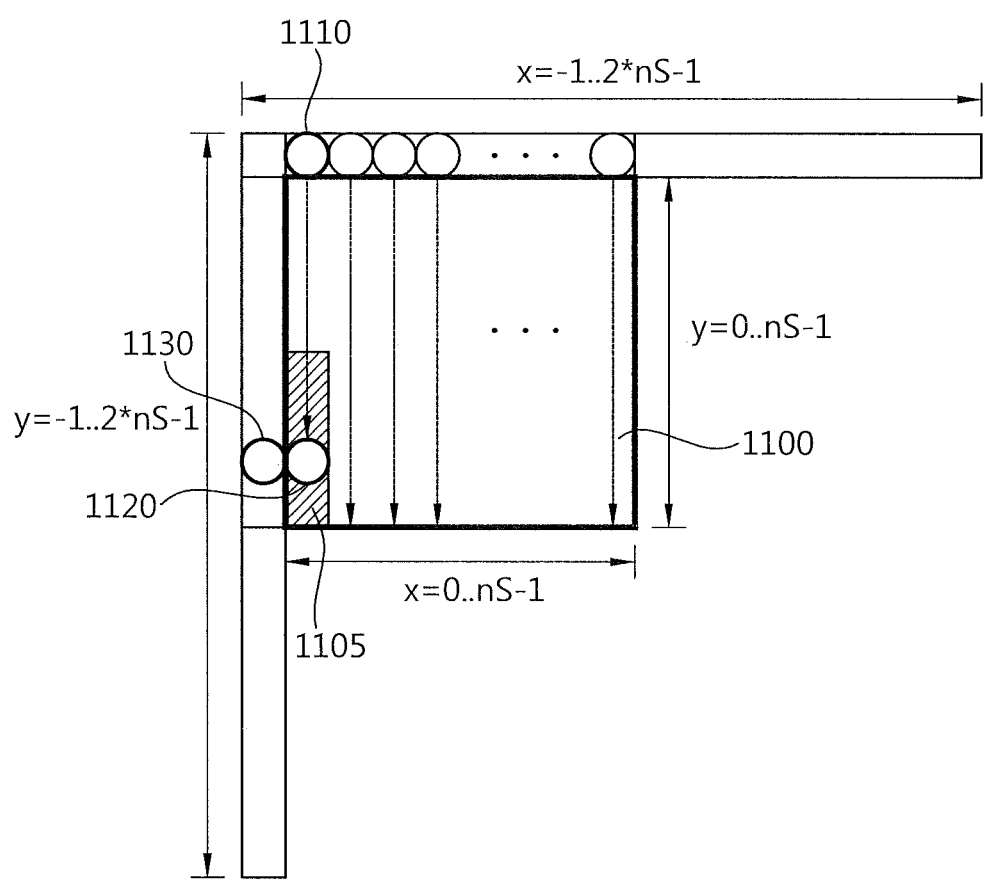
FIG. 11 is a diagram illustrating an example where the prediction direction is vertical in an intra prediction mode according to another embodiment of the invention.

FIG. 11 is a diagram illustrating an example where the prediction direction of an intra prediction mode is vertical according to another embodiment of the invention. Referring to FIG. 11, the smoothing filter may be applied to only some of the left boundary samples. That is, the larger the distance to the reference samples used for the prediction becomes, the lower the prediction accuracy becomes. Accordingly, the smoothing filter may be applied to only the samples in an area having low accuracy.

For example, the smoothing filter may be applied to only left boundary samples 1120 spaced apart from top reference samples 1110 out of the left boundary samples with respect to half the height of a current block 1100. The shaded portion 1105 in the drawing represents a filtering target area.

Even when the prediction mode of a current block is the horizontal prediction mode, it may be determined whether the filtering should be performed on the adjacent reference samples depending on the positions of the top boundary samples in the block.

Figure 12:
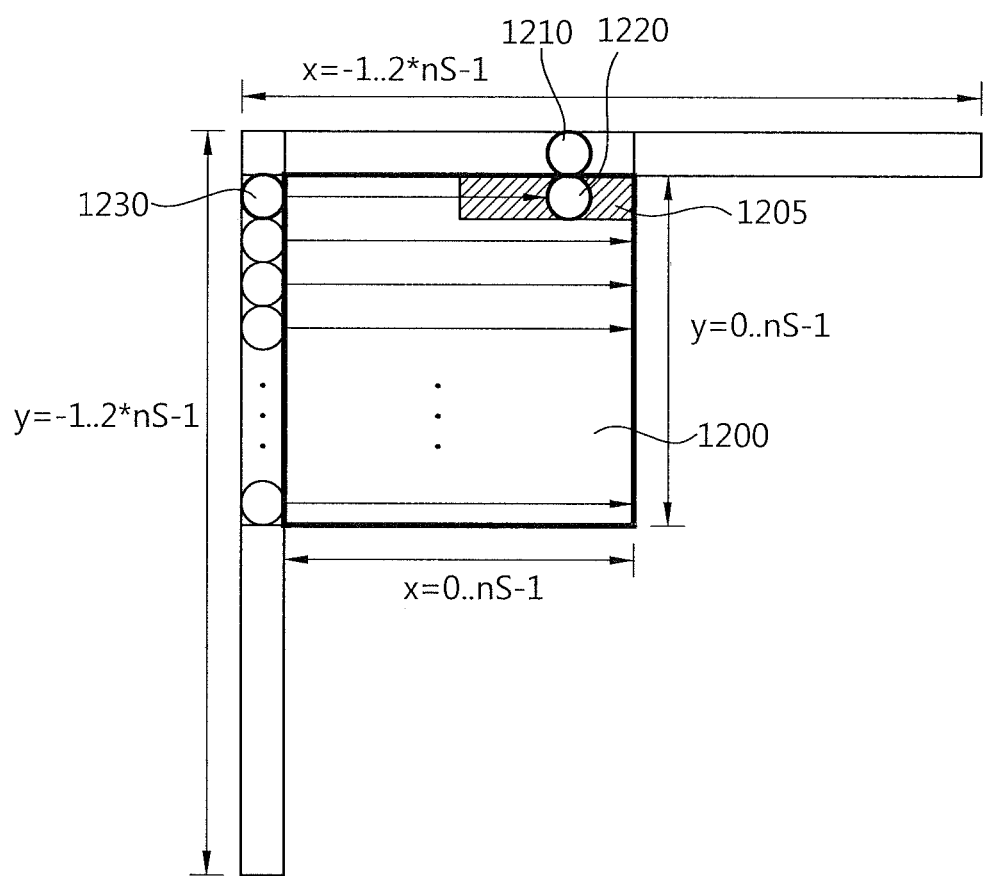
FIG. 12 is a diagram illustrating an example where the prediction direction is horizontal in an intra prediction mode according to another embodiment of the invention.

FIG. 12 is a diagram illustrating an example where the prediction direction of an intra prediction mode is horizontal according to another embodiment of the invention. Referring to FIG. 12, the smoothing filter may be applied to only some of the top boundary samples.

For example, the smoothing filter may be applied to only top boundary samples 1220 spaced apart from left reference samples 1230 out of the top boundary samples with respect to half the width of a current block 1200. The shaded portion 1205 in the drawing represents a filtering target area.

On the other hand, the area to which the smoothing filter is applied is not limited to half the height or width of the current block. That is, the area may be set to have a size of ¼ or ¾ thereof or may be adaptively determined on the basis of the distance to the samples used for the prediction depending on the intra prediction mode. In this case, the area to which the smoothing filter is applied may be defined in a lookup table to reduce a computational load of the encoder or the decoder.

On the other hand, the technical spirit of the invention can be applied to both the luma component and the chroma component, but may be applied to only the luma component and may not be applied to the chroma component. When the technical spirit of the invention is applied to only the luma component, the values of predicted samples of the chroma component are derived using the same method as in a general intra prediction mode.

Figure 13:
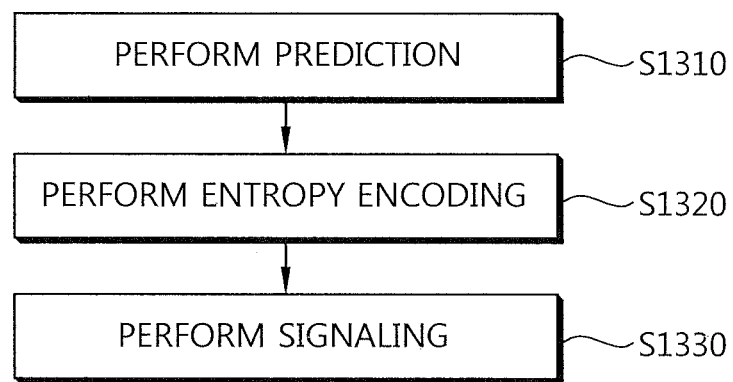
FIG. 13 is a diagram schematically illustrating operations of an encoder in a system according to the invention.

FIG. 13 is a diagram schematically illustrating the operation of an encoder in a system according to the invention.

The encoder performs a prediction process on a current block (S1310). The encoder constructs a predicted block of the current block on the basis of the prediction mode of the current block. Here, neighboring samples of the current block may be used as reference samples to derive the values of predicted samples.

When the prediction mode of the current block is an intra directional prediction mode, the encoder may derive the values of boundary samples not located in the prediction direction of the intra directional prediction mode out of the left boundary samples and the top boundary samples of the predicted block on the basis of the reference samples located in the prediction direction and the reference samples adjacent to the boundary samples. Here, the boundary samples mean samples which are located in the predicted block and which are neighboring to the boundary of the predicted block.

For example, when the intra directional prediction mode is the vertical prediction mode, the encoder may derive the values of the left boundary samples on the basis of the top reference samples of the left boundary samples and the reference samples adjacent to the left boundary samples. Here, the top reference samples mean samples which are neighboring to the top boundary of the current block and which have the same x coordinate.

For example, when the intra directional prediction mode is the vertical prediction mode, the encoder may derive the values of the left boundary samples on the basis of the top reference samples of the left boundary samples, the reference samples adjacent to the left boundary samples, and the reference sample neighboring to the left-top edge of the current block.

For example, when the intra directional prediction mode is the horizontal prediction mode, the encoder may derive the values of the top boundary samples on the basis of the left reference samples of the top boundary samples and the reference samples adjacent to the top boundary samples. Here, the left reference samples mean samples which are neighboring to the left boundary of the current block and which have the same y coordinate.

For example, when the intra directional prediction mode is the horizontal prediction mode, the encoder may derive the values of the top boundary samples on the basis of the left reference samples of the top boundary samples, the reference samples adjacent to the top boundary samples, and the reference sample neighboring to the left-top edge of the current block.

For example, when the prediction direction of the prediction mode is a top-right direction, the encoder may derive the values of the left boundary samples on the basis of the reference samples located in the prediction direction and the reference samples adjacent to the left boundary samples.

For example, when the prediction direction of the prediction mode is a left-bottom direction, the encoder may derive the values of the top boundary samples on the basis of the reference samples located in the prediction direction and the reference samples adjacent to the top boundary samples.

On the other hand, the encoder may derive the values of the predicted samples other than the boundary samples not located in the prediction direction of the intra directional prediction mode out of the left boundary samples and the top boundary samples of the predicted block to be the values of the reference values located in the prediction direction.

For example, when the intra directional prediction mode is the vertical prediction mode, the encoder may derive the values of the predicted samples to be the values of the top reference samples of the predicted samples.

For example, when the intra directional prediction mode is the horizontal prediction mode, the encoder may derive the values of the predicted samples to be the values of the left reference samples of the predicted samples.

The encoder entropy-encodes information on the predicted block constructed in the prediction step S1310 (S1320). As described above, encoding methods such as exponential golomb and CABAC may be used for the entropy encoding, and codewords may be allocated in consideration of an appearance frequency of a prediction mode or a prediction type.

The encoder signals the information encoded in the entropy encoding step S1320 (S1330). For example, the encoder may signal the prediction mode information and the residual signal between the predicted block and the original block. When the smoothing filter is applied to the procedure of performing the intra prediction, the information on the coefficients of the smoothing filter may be signaled.

Figure 14:
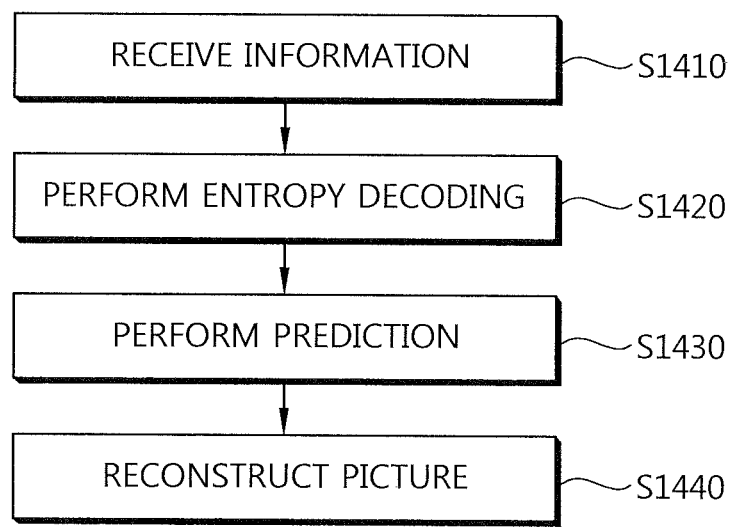
FIG. 14 is a diagram schematically illustrating operations of a decoder in a system according to the invention.

FIG. 14 is a diagram schematically illustrating the operation of a decoder in a system according to the invention.

The decoder receives information from an encoder (S1410). The information received from the encoder may be supplied with a bitstream having the information loaded thereon.

The decoder entropy-decodes the information received in the information receiving step S1410 (S1420). The decoder may acquire information for prediction of the current block, such as the prediction method (inter prediction/intra prediction) of the current block, a motion vector (inter prediction), a prediction mode (intra prediction), and a residual signal, in the entropy decoding step S1420.

The decoder performs a prediction process on the current block on the basis of the information acquired in the entropy decoding step S1420 (S1430). The decoder constructs a predicted block of the current block on the basis of the prediction mode of the current block. Here, neighboring samples of the current block may be used as reference samples so as to derive the values of the predicted samples.

The prediction method performed in the decoder is identical or similar to the prediction method performed in the encoder.

That is, when the prediction mode of the current block is an intra directional prediction mode, the decoder may derive the values of the boundary samples not located in the prediction direction of the intra directional prediction mode out of the left boundary samples and the top boundary samples of the predicted block on the basis of the reference samples located in the prediction direction and the reference samples adjacent to the corresponding boundary samples.

For example, the intra directional prediction mode is the vertical prediction mode, the decoder may derive the values of the left boundary samples on the basis of the top reference samples of the left boundary samples and the reference samples adjacent to the left boundary samples.

For example, the intra directional prediction mode is the vertical prediction mode, the decoder may derive the values of the left boundary samples on the basis of the top reference samples of the left boundary samples, the reference samples adjacent to the left boundary samples, and the reference sample neighboring to the left-top edge of the current block.

For example, the intra directional prediction mode is the horizontal prediction mode, the decoder may derive the values of the top boundary samples on the basis of the left reference samples of the top boundary samples and the reference samples adjacent to the top boundary samples.

For example, the intra directional prediction mode is the horizontal prediction mode, the decoder may derive the values of the top boundary samples on the basis of the left reference samples of the top boundary samples, the reference samples adjacent to the top boundary samples, and the reference sample adjacent to the left-top edge of the current block.

For example, when the prediction direction of the prediction mode is a top-right direction, the decoder may derive the values of the left boundary samples on the basis of the reference samples located in the prediction direction and the reference samples adjacent to the left boundary samples.

For example, when the prediction direction of the prediction mode is a left-bottom direction, the encoder may derive the values of the top boundary samples on the basis of the reference samples located in the prediction direction and the reference samples adjacent to the top boundary samples.

The decoder may derive the values of the predicted samples other than the boundary samples not located in the prediction direction of the intra directional prediction mode out of the left boundary samples and the top boundary samples of the predicted block to be the values of the reference samples located in the prediction direction.

For example, when the intra directional prediction mode is the vertical prediction mode, the decoder may derive the values of the predicted samples to be the values of the top reference samples of the predicted samples.

For example, when the intra directional prediction mode is the horizontal prediction mode, the decoder may derive the values of the predicted samples to be the values of the left reference samples of the predicted samples.

The decoder reconstructs a picture on the basis of the predicted block constructed in the prediction step S1430 (S1440).

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments can include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. A method for decoding an image, performed by a decoding apparatus, the method comprising:
receiving prediction mode information;
deriving an intra prediction mode for a current block based on the prediction mode information; and
generating prediction samples of the current block based on the intra prediction mode,
wherein the intra prediction mode is a horizontal prediction mode having a horizontal prediction direction,
wherein the prediction samples are generated based on first reference samples located along the horizontal prediction direction with regard to locations of the prediction samples,
wherein a prediction sample which is adjacent to a top boundary of the current block among the prediction samples is filtered based on a second reference sample located along a vertical direction with regard to a location of the prediction sample,
wherein the second reference sample is adjacent to an upper side of the prediction sample, and
wherein a filtering coefficient applied to a value of the prediction sample is larger than a filtering coefficient applied to a value of the second reference sample.

2. The method of claim 1, wherein the first reference samples are adjacent to a left boundary of the current block.

3. The method of claim 1, wherein a prediction sample which is not adjacent to a top boundary of the current block among the prediction samples is not filtered.

4. The method of claim 1, wherein the second reference sample has the same x coordinate with the prediction sample.

5. The method of claim 1, wherein the prediction sample is adjacent to a lower side of the upper boundary of the current block, and
wherein the second reference sample is adjacent to an upper side of the upper boundary of the current block.

6. A method for encoding an image, performed by an encoding apparatus, the method comprising:
deriving an intra prediction mode for a current block;
generating prediction mode information based on the intra prediction mode;
generating prediction samples of the current block based on the intra prediction mode;
generating residual information based on the prediction samples; and
encoding image information including the prediction mode information and the residual information,
wherein the intra prediction mode is a horizontal prediction mode having a horizontal prediction direction,
wherein the prediction samples are generated based on first reference samples located along the horizontal prediction direction with regard to locations of the prediction samples,
wherein a prediction sample which is adjacent to a top boundary of the current block among the prediction samples is filtered based on a second reference sample located along a vertical direction with regard to a location of the prediction sample,
wherein the second reference sample is adjacent to an upper side of the prediction sample, and
wherein a filtering coefficient applied to a value of the prediction sample is larger than a filtering coefficient applied to a value of the second reference sample.

7. The method of claim 6, wherein the first reference samples are adjacent to a left boundary of the current block.

8. The method of claim 6, wherein a prediction sample which is not adjacent to a top boundary of the current block among the prediction samples is not filtered.

9. The method of claim 6, wherein the second reference sample has the same x coordinate with the prediction sample.

10. The method of claim 6, wherein the prediction sample is adjacent to a lower side of the upper boundary of the current block, and
wherein the second reference sample is adjacent to an upper side of the upper boundary of the current block.

11. A non-transitory decoder-readable storage medium storing encoded image information generated by a method for encoding an image, the method comprising:
deriving an intra prediction mode for a current block;
generating prediction mode information based on the intra prediction mode;
generating prediction samples of the current block based on the intra prediction mode;
generating residual information based on the prediction samples; and
encoding image information including the prediction mode information and the residual information,
wherein the intra prediction mode is a horizontal prediction mode having a horizontal prediction direction,
wherein the prediction samples are generated based on first reference samples located along the horizontal prediction direction with regard to locations of the prediction samples,
wherein a prediction sample which is adjacent to a top boundary of the current block among the prediction samples is filtered based on a second reference sample located along a vertical direction with regard to a location of the prediction sample,
wherein the second reference sample is adjacent to an upper side of the prediction sample, and
wherein a filtering coefficient applied to a value of the prediction sample is larger than a filtering coefficient applied to a value of the second reference sample.

12. The non-transitory decoder-readable storage medium of claim 11, wherein the first reference samples are adjacent to a left boundary of the current block.

13. The non-transitory decoder-readable storage medium of claim 11, wherein a prediction sample which is not adjacent to a top boundary of the current block among the prediction samples is not filtered.

14. The non-transitory decoder-readable storage medium of claim 11, wherein the second reference sample has the same x coordinate with the prediction sample.

15. The non-transitory decoder-readable storage medium of claim 11, wherein the prediction sample is adjacent to a lower side of the upper boundary of the current block, and
wherein the second reference sample is adjacent to an upper side of the upper boundary of the current block.

\* \* \* \* \*